US009880529B2

(12) United States Patent
Girardeau, Jr.

(10) Patent No.: US 9,880,529 B2
(45) Date of Patent: Jan. 30, 2018

(54) RECREATING MACHINE OPERATION PARAMETERS FOR DISTRIBUTION TO ONE OR MORE REMOTE TERMINALS

(71) Applicant: James Ward Girardeau, Jr., Austin, TX (US)

(72) Inventor: James Ward Girardeau, Jr., Austin, TX (US)

( * ) Notice: Subject to any disclaimer, the term of this patent is extended or adjusted under 35 U.S.C. 154(b) by 709 days.

(21) Appl. No.: 14/012,621

(22) Filed: Aug. 28, 2013

(65) Prior Publication Data

US 2015/0059459 A1  Mar. 5, 2015

(51) Int. Cl.
  *G05B 15/02*  (2006.01)
(52) U.S. Cl.
  CPC ................... *G05B 15/02* (2013.01)
(58) Field of Classification Search
  None
  See application file for complete search history.

(56) References Cited

U.S. PATENT DOCUMENTS

| | | | | | |
|---|---|---|---|---|---|
| 3,555,194 | A | * | 1/1971 | Goto | H04J 3/0676 331/12 |
| 3,557,347 | A | * | 1/1971 | Robertson | G06J 1/00 708/2 |
| 3,864,557 | A | * | 2/1975 | Sindelar | G05B 19/4103 318/571 |
| 3,878,372 | A | * | 4/1975 | Sindelar | G05B 19/416 101/91 |
| 4,176,396 | A | * | 11/1979 | Howatt | G01N 3/58 700/175 |
| 4,293,950 | A | * | 10/1981 | Shimizu | G11C 29/56 714/743 |
| 4,536,849 | A | * | 8/1985 | Borisch | G05B 19/4063 324/73.1 |
| 4,663,721 | A | * | 5/1987 | Herscovici | B23F 23/1287 318/561 |
| 4,724,524 | A | * | 2/1988 | Thomas | G05B 19/4065 340/680 |
| 5,065,349 | A | * | 11/1991 | Thomas | G07C 5/0858 340/969 |

(Continued)

FOREIGN PATENT DOCUMENTS

EP  0928413 B1  8/2002
EP  0998661 B1  11/2002

*Primary Examiner* — Mohammad Ali
*Assistant Examiner* — Kelvin Booker
(74) *Attorney, Agent, or Firm* — Frank H Pham; Pham IP Group

(57) ABSTRACT

This invention provides a method and an apparatus for recreating data collected from a machine for distribution to one or more remote terminals for monitoring and evaluating machine operations. Machine operation parameters are sensed by at least one sensor, and the data collected regarding measured values of machine operations are transmitted to a conditioning device. The conditioning device validates the data by comparing and correlating the measured values to predetermined values of acceptable data set and converts output data from analog to digital data. The digitized analog data according to the measured parameters associated with machine operations are then transmitted to a data storage unit, where it is stored and subsequently retrieved for recreating the machine operation parameters to become accessible by one or more remote terminals.

10 Claims, 2 Drawing Sheets

(56) References Cited

U.S. PATENT DOCUMENTS

| | | | |
|---|---|---|---|
| 5,241,649 A * | 8/1993 | Niyada | G10L 15/10 704/234 |
| 5,720,066 A | 2/1998 | Kim | |
| 5,788,851 A * | 8/1998 | Kenley | A61M 1/14 210/143 |
| 5,844,738 A * | 12/1998 | Behrens | G11B 5/012 360/40 |
| 6,370,957 B1 | 4/2002 | Filippenko et al. | |
| 6,429,995 B1 * | 8/2002 | Dobbek | G11B 5/59655 360/77.08 |
| 6,604,013 B1 * | 8/2003 | Hamidieh | G05B 19/4065 700/174 |
| 6,990,432 B1 * | 1/2006 | McCarthy, IV | G05B 13/021 105/61.5 |
| 7,124,041 B1 * | 10/2006 | Johnson | G05B 9/02 324/140 R |
| 7,181,370 B2 * | 2/2007 | Furem | E02F 9/205 701/50 |
| 7,283,914 B2 | 10/2007 | Poorman et al. | |
| 7,284,255 B1 * | 10/2007 | Apel | H04H 60/44 704/201 |
| 7,308,550 B2 * | 12/2007 | Cornett | G05B 19/056 711/115 |
| 7,406,399 B2 * | 7/2008 | Furem | E02F 9/267 37/379 |
| 7,409,261 B2 | 8/2008 | Jalluri et al. | |
| 7,555,674 B1 * | 6/2009 | Wang | G06F 11/1662 714/12 |
| 7,689,394 B2 * | 3/2010 | Furem | E02F 9/267 703/8 |
| 7,716,077 B1 * | 5/2010 | Mikurak | G06Q 10/06 705/7.12 |
| 8,036,872 B2 * | 10/2011 | Nasle | G06F 17/5009 700/11 |
| 8,229,031 B2 * | 7/2012 | Schmid | G01S 19/24 342/451 |
| 8,699,620 B1 * | 4/2014 | Wu | H04N 7/52 375/254 |
| 8,775,934 B2 * | 7/2014 | Nasle | G06F 8/38 715/700 |
| 9,138,558 B1 * | 9/2015 | Kusik | A61B 5/486 |
| 9,405,283 B1 * | 8/2016 | Damico | G05B 19/0426 |
| 2002/0011928 A1 * | 1/2002 | Williams | B60Q 9/006 340/436 |
| 2002/0049565 A1 * | 4/2002 | Kirila, II | B29C 45/76 702/188 |
| 2002/0155818 A1 * | 10/2002 | Boros | H01Q 1/246 455/67.14 |
| 2003/0002710 A1 * | 1/2003 | Rhoads | G06F 17/30876 382/100 |
| 2003/0061008 A1 * | 3/2003 | Smith, Jr. | G05B 23/0283 702/188 |
| 2003/0091189 A1 * | 5/2003 | Rhoads | H04K 1/02 380/252 |
| 2004/0190092 A1 * | 9/2004 | Silverbrook | G06F 3/0317 358/539 |
| 2005/0155473 A1 * | 7/2005 | Gass | B23D 59/001 83/58 |
| 2006/0089743 A1 | 4/2006 | Jalluri et al. | |
| 2006/0100797 A1 | 5/2006 | Poorman et al. | |
| 2006/0101269 A1 * | 5/2006 | Moskowitz | G06F 21/10 713/176 |
| 2006/0149167 A1 * | 7/2006 | Yeh | A61B 5/103 600/587 |
| 2006/0247795 A1 * | 11/2006 | Gass | B23D 59/001 700/1 |
| 2007/0078614 A1 * | 4/2007 | Discenzo | G05B 19/4062 702/60 |
| 2007/0173989 A1 * | 7/2007 | Walker | G06F 11/2294 701/19 |
| 2009/0083705 A1 * | 3/2009 | Phillips | G05B 19/056 717/113 |
| 2009/0094946 A1 * | 4/2009 | Trinko | G01N 21/89 53/456 |
| 2009/0100096 A1 * | 4/2009 | Erlichson | H04L 67/02 |
| 2009/0132458 A1 * | 5/2009 | Edwards | G06N 5/025 706/50 |
| 2009/0236012 A1 * | 9/2009 | Gass | B23Q 11/0092 144/427 |
| 2010/0030493 A1 * | 2/2010 | Rao | G01H 1/003 702/39 |
| 2010/0073284 A1 * | 3/2010 | Dods | G06F 3/017 345/156 |
| 2010/0097733 A1 * | 4/2010 | E. | H02H 1/0015 361/42 |
| 2010/0199102 A1 * | 8/2010 | Knepper | A61M 16/00 713/189 |
| 2011/0012661 A1 * | 1/2011 | Binder | H04W 4/008 327/276 |
| 2011/0061769 A1 * | 3/2011 | Gass | B23D 45/067 144/382 |
| 2011/0063503 A1 * | 3/2011 | Brand | H04N 5/4401 348/500 |
| 2011/0108181 A1 | 5/2011 | Cai et al. | |
| 2012/0124098 A1 * | 5/2012 | Damm | G06N 99/005 707/794 |
| 2012/0190380 A1 * | 7/2012 | Dupray | G01S 1/026 455/456.1 |
| 2012/0209578 A1 * | 8/2012 | Stevens | G05B 17/02 703/6 |
| 2013/0051780 A1 * | 2/2013 | Takahata | G03B 17/14 396/85 |
| 2013/0090745 A1 * | 4/2013 | Frazer | G05B 15/02 700/12 |
| 2013/0114610 A1 * | 5/2013 | Polcyn | H04L 49/70 370/400 |
| 2014/0135972 A1 * | 5/2014 | Galeb | B05C 11/1013 700/157 |
| 2014/0162616 A1 * | 6/2014 | Bradley | H04M 1/72577 455/418 |
| 2014/0222378 A1 * | 8/2014 | Piety | G05B 23/02 702/183 |
| 2014/0254807 A1 * | 9/2014 | Fonseca, Jr. | H04R 29/00 381/56 |
| 2014/0309782 A1 * | 10/2014 | Sharpe | G05D 21/02 700/266 |
| 2014/0347663 A1 * | 11/2014 | Rodes | G01N 1/2273 356/338 |
| 2015/0026107 A1 * | 1/2015 | Vijayaraghavan | G06Q 10/06 706/12 |
| 2015/0112640 A1 * | 4/2015 | Niro | G01D 15/00 702/183 |
| 2015/0116132 A1 * | 4/2015 | Nohra | H04Q 9/00 340/870.07 |
| 2015/0188932 A1 * | 7/2015 | King | H04L 63/1408 726/22 |
| 2015/0293507 A1 * | 10/2015 | Burns | G05B 15/02 700/83 |
| 2016/0044439 A1 * | 2/2016 | Mittal | H04W 4/005 370/311 |
| 2016/0062954 A1 * | 3/2016 | Ruff | G06F 17/21 715/249 |
| 2016/0069940 A1 * | 3/2016 | Chang | G01R 21/133 324/76.77 |
| 2016/0146646 A1 * | 5/2016 | Willis | G01D 21/00 702/89 |
| 2016/0301490 A1 * | 10/2016 | Williams | H04J 3/0661 |

* cited by examiner

RECREATING MACHINE OPERATION PARAMETERS FOR DISTRIBUTION TO ONE OR MORE REMOTE TERMINALS

BACKGROUND OF THE INVENTION

1. Field of the Invention

This invention relates to the field of recreating machine operations parameters for monitoring and evaluating an assessment of physical conditions related to machine, environment, and structures.

2. Background Art

Manufacturers have developed systems and methods for predictive and preventive machinery maintenance. Such systems may include a scheduled machine tool change based on a number of parts produced and scheduled machine down time, during which bearings and other components may be replaced prior to their having an adverse effect on product quality. To implement these systems in a cost-effective manner, and to reduce the frequency of these preventative maintenance tasks, decision-makers need to obtain information. In particular, if information indicative of historical trends is useful, accurate predictions can be made regarding future production runs. Also, if the ability to isolate particular problem areas is useful, it helps to concentrate efforts where they will have the most impact and produce the most benefit.

Manufacturers have continued to analyze machine tools and their associated components in an effort to gather information, which they can use to make efficacious decisions regarding their production systems and processes. The types of machine tool analysis are vibration, temperatures, and velocity. Information gathered from these types of analysis may be indicative of a variety of different production problems.

In addition to gathering data indicative of machine operation parameters, it may also be desirable to associate the data with particular operations performed on a machine. Once the data is gathered, it would then be desirable to collect for storage on database that can be subsequently retrieved by one or more remote terminals.

Machine operation parameters refer to a physical property of a machine that is measurable such as temperature, vibration, acceleration, velocity, pressure, liquid level, gas level, gas concentrations, sound, electric field, speed, torque or displacement. Machine requires monitoring spans many industries and includes many types of machines such as mining equipment, draglines, large trucks, industrial robots, over head cranes; heavy industrial equipment such as earth movers; rotating bearings found in factories; rotating machines in steel mills, paper mills, cement factories, petroleum factories, chemical factors, storage facilities; pumps, motors, valves, transformers, generators, centrifuges, and fans. A typical example related to this invention would be monitoring rotating bearings in a paper mill. Another example is monitoring bearings in a mining drag line and stress in an overhead crane. A separate area related to this invention is monitoring the conditions such as temperature, stress or vibration of large structures such as bridges or buildings. In addition, this invention is useful for testing and monitoring of vehicles such as aircraft, spacecraft, or racing cars during normal operations or design phase testing.

Machine operation parameters are typically measured with at least one sensor such as an accelerometer, thermometer probe, gas detector, level detector, velocity probe, displacement probe, pressure sensor, sound level, ultrasonic, humidity probe, corrosion strip, load cell, RTD, proximity sensor, tachometer, or any other suitable sensor capable of sensing a machine operation parameter. Sensors are connected to a concentrator at a central location.

Each type of sensors can vary in form and output and can be coupled to a machine to produce an analog output voltage or current or digital representative of the parameter being measured. A typical sensor produces an analog signal representing a data set of output parameters such as frequency range, voltage range, current range, temperature, impedance, and other electrical, mechanical, or physical properties.

An analyzer converts output analog data collected by the sensor to digital data. The processing steps might include low-pass filtering, high-pass filtering, band-pass filtering, gain adjustment, non-linear adjustments, noise mitigation, zero crossing detection, level detection, or analog to digital conversion, and other types of linear or non linear processing steps. Non-linear adjustments might include distortion correction, limiting, and rectification. It is apparent to those skilled in the art that there are many possible processing steps and many ways to obtain digital data from analog data.

A typical analyzer is a handheld unit that processes and converts the output analog data indicative of machine operation parameters to digital representation format, where it is stored in the analyzer. The analyzer includes detection methods to validate that the sensor is a correct type of sensor, that the sensor is operating correctly, and that the output machine operation parameters are correct. The analyzer might check for shorts or opens in the sensor, lack of output activity, or other fault conditions. In some analyzers the data will be rejected and not stored or marked as bad if the sensor parameters do not appear to be correct.

Some analyzers have extensive analysis capabilities, and can apply various time domain filters and analysis steps. Frequency domain analysis is available in some analyzers, whereby the processed time domain signal can be viewed in the frequency domain, allowing analysis of frequency dependent data. Multiple sensory output data can be collected coherently by an analyzer to produce multi-dimensional plots or to perform multi-dimensional analysis. The analyzer is connected to the concentrator, and a selector is used to connect any one of the sensor channels to the analyzer.

Machine operation parameters collected by an analyzer are typically transmitted via Ethernet, USB, serial port, parallel port, memory cards, portable disk drivers, and wireless network to a data storage unit where the digital data is stored in a database. In some cases, machine operation parameters are collected without the first step of collecting the sensor data into an analyzer; instead, sensory output data is stored directly on a host database server. The host database server is typically a server or mainframe that runs an operating system such as a variety of Windows or Linux, with disk storage for the machine operation parameters and the capability to run analysis programs either locally or remotely (over internet protocol network and wireless network) to analyze the stored output parameters.

A variety of vendors provide collection systems to collect, store and analyze machine operation parameters, and each collection system typically uses a proprietary database to store the output parameters.

Machine operation parameters obtained from one collection system are generally unrecognized by another collection system. Machine operation parameters stored on disk are typically stored in an unpublished and proprietary format, and might be encrypted, or contain specific formatting that is useful to a particular collection system but unrecognized by others.

Likewise, the analyzer from one collection system may not be compatible with another vendor nor is the method for collecting sensory output parameters. A need exists in the art for a method and an apparatus for recreating machine operation parameters collected from varying collection systems to the same characteristics of collected machine operation parameters, so that others may use them to monitor and evaluate the machine operations.

SUMMARY OF THE INVENTION

The present invention is directed to a method and apparatus of recreating machine operation parameters to the same characteristics of the original parameters. The method includes a machine operation to be measured. A first machine operation parameter is measured by at least one sensor. Output data is collected indicative of a measured value of first machine operation parameters and recorded as analog data. An analyzer validates the output analog data to determine if it fits within predetermined values of acceptable data. The analyzer then converts the output analog data to digital data, and transmits the digitized analog data to a data storage unit. A processing unit subsequently retrieves stored digital data from the database, and converts it to analog data. The processing unit further adjusts the converted analog data to the same measured values of the first machine operation parameters.

The present invention also involves an apparatus for recreating machine operation parameters. The apparatus includes at least one sensor operable for measuring a first machine operation parameter and producing output analog data indicative of the first machine operation parameter. A conditioning device is provided and operable to compare the output analog data to predetermined value of acceptable data. The conditioning device further comprises an analog to digital converter to digitize the output analog data to digital data. In addition, a data storage unit includes an interface circuit configured to receive the digital data and to upload it in a host database server for subsequent retrieval. A processing unit is operable to reproduce the analog data by converting the digital data retrieved from the host database server to the same analog data indicative of measured values of the first machine operation parameters. The processing unit further adjusts the reproduced analog data to match the original output analog data.

DETAILED DESCRIPTION OF THE INVENTION

Figure 1:
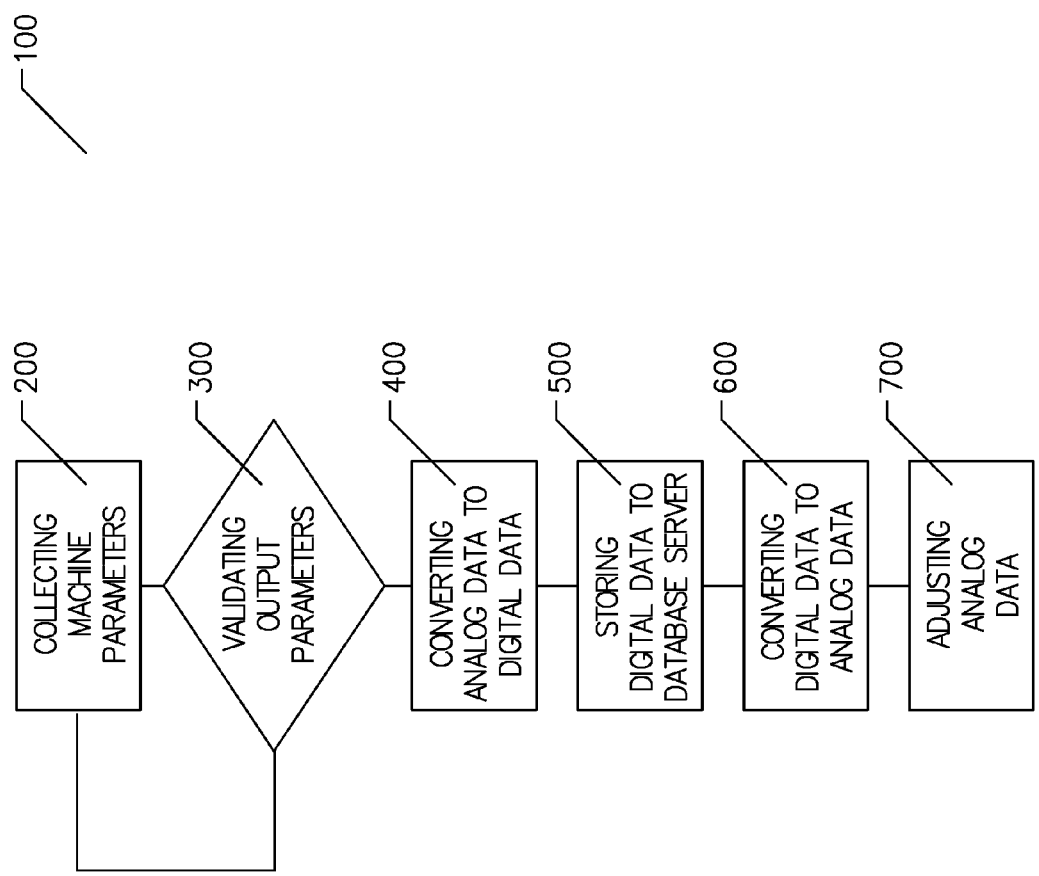
FIG. 1 is a flow chart describing a method for recreating machine operation parameters using the apparatus of FIG. 2.
Figure 2:
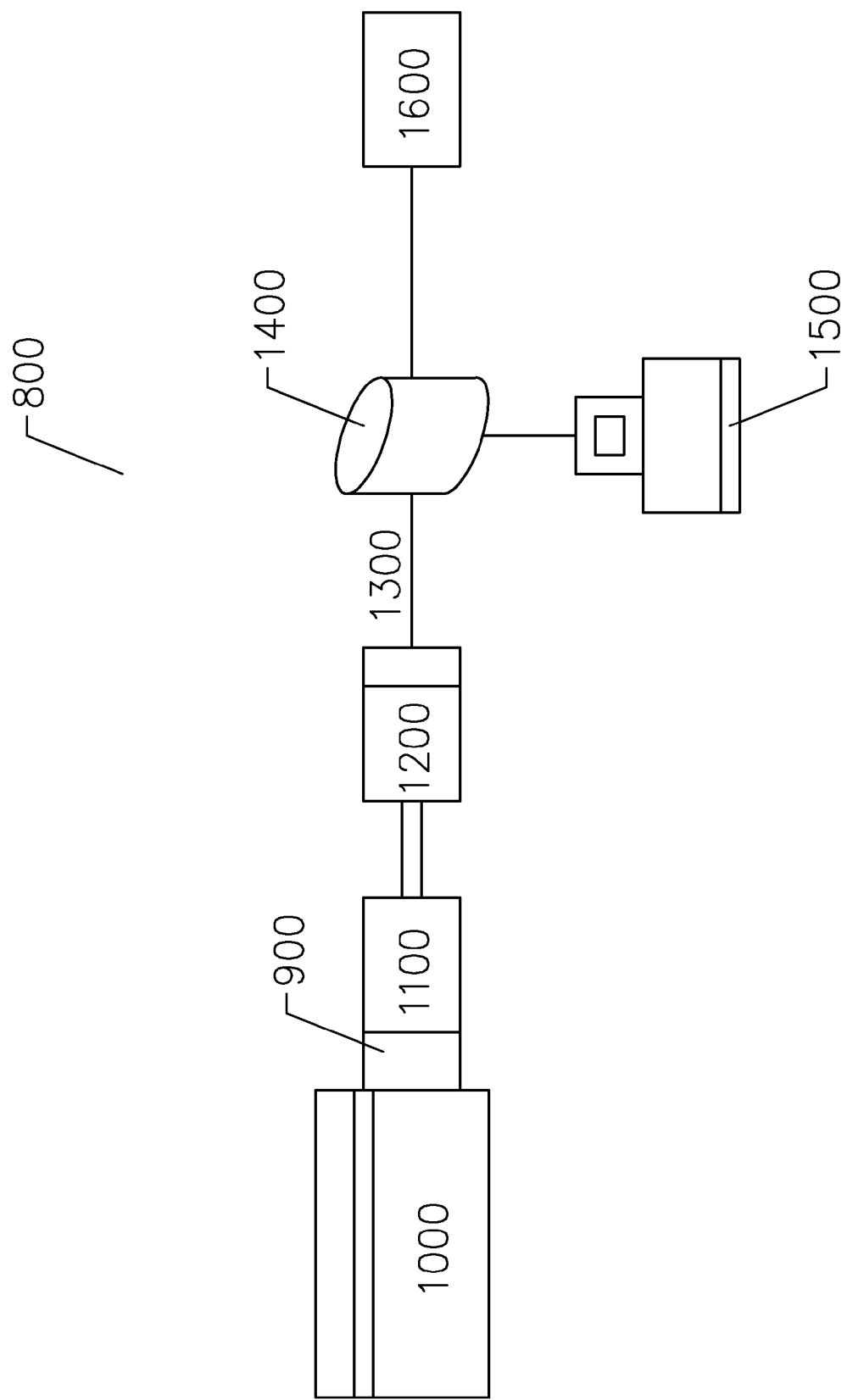
FIG. 2 is a schematic illustration of an apparatus for recreating machine operation parameters.

Referring to FIG. 1, and with reference to the apparatus 800 of FIG. 2, the present method 100 begins with step 200, wherein a first machine operation 1000 is being performed. At step 200, at least one sensor 900 measures machine operation parameters, captures the sensory data, produces a first output analog data indicative of machine operation parameters 1100, and transmits the output analog data, via a wireless network, to an analyzer 1200. The sensor 900 may be chosen from any type of machine operation parameter sensors such as accelerometer, thermometer probe, gas detector, level detector, velocity probe, displacement probe, pressure sensor, sound level, ultrasonic, humidity probe, corrosion strip, load cell, RTD, proximity sensor, or tachometer. Indeed, any other suitable sensor capable of sensing machine operation parameters can be used to send analog signals to the analyzer 1200.

Once the analyzer 1200 receives the first output analog data, the method 100 proceeds step 300, wherein the analyzer 1200 makes a determination to validate the output parameters 1100. If the analyzer 1200 determines that the output analog data indicative of machine operation parameters 1100 corresponds to a predetermined set of acceptable data, the method 100 proceeds step 400; otherwise, the method 100 proceeds step 200.

At step 400, the passing output analog data indicative of machine operation parameters 1100 is converted by the analyzer 1200 to digital data 1300 representative of sensory data collected by the sensors 900, only if it has been independently validated in step 300.

At step 500, the digital data 1300 collected from the analyzer 1200 is transmitted, via a wireless network, to store in a data storage unit 1400 where the digital data 1300 will be uploaded to a host database server 1500.

At step 600, once the processing unit 1600 receives the digital data 1300 retrieved from the data storage unit 1400, it converts the digital data 1300 to output analog data for distribution.

At step 700, the processing unit 1600 is operable to adjust the output analog data as noted above by filtering high and low band pass, adjusting gain to make the same level as before, and adjusting impedance and bias current to make the data look the same as the output data collected from the sensors. The method 100 is then finished.

While the invention has been described in terms of several embodiments, it will be apparent to those skilled in the art that various changes can be made to the described embodiments without departing from the scope of the invention as set forth in the following claims.

What is claimed is:

1. A method for recreating machine operation parameters comprising the following steps of:
    (a) collecting a first output analog signal indicative of machine operation parameters from a machine operation using a sensor positioned with respect to said machine interfaces;
    (b) validating operational characteristics of said first output analog signal for distortion and inaccuracy of said first output analog signal wherein said operational characteristics are compared to a set of predetermined values to determine said distortion and inaccuracy of said first output analog signal;
    (c) converting said first output analog signal to a first digital signal representative of said machine operation parameters;
    (d) transmitting said first output digital signal to a data storage unit;
    (e) retrieving said first digital signal from said data storage unit;
    (f) converting said first digital signal representative of said machine operation parameters to a second output analog signal;
    (g) adjusting said operational characteristics of second output analog signal to make the same level of said operational characteristics of first output analog signal indicative of said machine operation parameters; and
    (h) distributing said second output analog signal to at least one remote terminal for controlling machine operation parameters.

2. The method of claim 1, wherein the sensing step receiving at least one machine operation parameter sensed by a sensor selected from the group consisting of accelerometer, thermometer probe, gas detector, level detector, velocity probe, displacement probe, pressure sensor, sound level, ultrasonic, humidity probe, corrosion strip, load cell, RTD, proximity sensor, tachometer.

3. The method of claim 1, wherein the sensing step collects at least one machine operation parameter selected from the group consisting of velocity, acceleration, displacement, temperature.

4. The method of claim 1, wherein the transmitting step said first digital signal to a data storage unit via Ethernet, USB, serial port, parallel port, memory card, portable disk driver, and wireless network.

5. An apparatus for recreating machine operation parameters for distribution to one or more remote terminals, the apparatus comprising:
   (a) at least one sensor positioned with respect to machine interfaces to sense machine operation parameters, capture a first sensory data of said machine operation parameters, and produce a first output analog signal indicative of a measured value of said first sensory data;
   (b) a conditioning device having an analog input connected to said sensor and a digital output connected to a transmitting device wherein said conditioning device receives said first output analog signal, validates said first output analog signal, and converts said first output analog signal to a first digital output signal:
   (c) a data storage unit to receive and to store said first digital signal; and
   (d) a processing unit operatively connected to said data storage unit to convert said first digital signal to a second output analog signal wherein said second output analog signal is adjusted to the same level of said first output analog signal indicative of said first sensory data, and distributing said second output analog signal to at least one remote terminal for controlling machine operation parameters.

6. The apparatus of claim 5, wherein said sensor is further configured to transmit said first output analog signal, via a wireless network, to said conditioning device.

7. The apparatus of claim 5, wherein said conditioning device further comprises an analog-to-digital converter.

8. The apparatus of claim 5, wherein said conditioning device further comprises a fault report detector device to validate said first output analog signal.

9. The apparatus of claim 8, wherein the fault report detector device is further configured to validate, in real time, said operational first output analog signal to fit within predetermined values of acceptable data.

10. The apparatus of claim 5, wherein the processing unit further comprising a digital to analog converter to convert said first digital signal to said second analog signal indicative of said first sensory data.

\* \* \* \* \*